US007155209B2

(12) United States Patent
Zom et al.

(10) Patent No.: US 7,155,209 B2
(45) Date of Patent: Dec. 26, 2006

(54) MESSAGING SYSTEM

(75) Inventors: Pablo Zom, Rotterdam (NL); Jacobine Johanette Mannak, The Hague (NL); Sofie Drijver, The Hague (NL); Pauline Martine Van Hoorik, The Hague (NL); Evelien Maria Perik, Eindhoven (NL)

(73) Assignee: Koninklijke KPN. N.V., Groningen (NL)

( * ) Notice: Subject to any disclaimer, the term of this patent is extended or adjusted under 35 U.S.C. 154(b) by 102 days.

(21) Appl. No.: 10/311,941

(22) PCT Filed: Jun. 28, 2001

(86) PCT No.: PCT/EP01/07395

§ 371 (c)(1),
(2), (4) Date: Jul. 8, 2003

(87) PCT Pub. No.: WO02/03670

PCT Pub. Date: Jan. 10, 2002

(65) Prior Publication Data

US 2004/0043778 A1    Mar. 4, 2004

(30) Foreign Application Priority Data

Jul. 3, 2000    (NL)    .................................. 1015597

(51) Int. Cl.
*H04Q 7/20*    (2006.01)
(52) U.S. Cl. ................ 455/413; 455/414.1; 455/412.1; 455/412.2; 455/403; 455/422.1; 455/518; 455/519; 379/88.22; 379/88.23; 379/67.1

(58) Field of Classification Search ................ 455/403, 455/414.1, 414.4, 413, 412.1, 412.2, 422.1, 455/550.1, 500, 518, 519, 426.1, 445; 379/88.22, 379/88.23, 67.1
See application file for complete search history.

(56) References Cited

U.S. PATENT DOCUMENTS

| 4,581,486 | A | * | 4/1986 | Matthews et al. | ........ 379/88.26 |
| 5,260,986 | A | | 11/1993 | Pershan | ........................ 379/57 |
| 5,711,011 | A | * | 1/1998 | Urs et al. | .................... 455/520 |
| 6,246,871 | B1 | * | 6/2001 | Ala-Laurila | .................. 455/413 |
| 6,757,531 | B1 | * | 6/2004 | Haaramo et al. | ......... 455/414.1 |

FOREIGN PATENT DOCUMENTS

| WO | WO 98/23058 | 5/1998 |
| WO | WO 00/65816 | 11/2000 |

* cited by examiner

*Primary Examiner*—Keith Ferguson
(74) *Attorney, Agent, or Firm*—Michaelson & Associates; Peter L. Michaelson

(57) ABSTRACT

Messaging system for mobile terminals where the system utilizes a message server which exchanges messages, originating from the terminals, through use of an identification code. The message server grants each terminal access to the messages originating from terminals which use identification codes that belong to the same group of identification codes. The identification codes within each group can be identical or non-identical, and, as for the latter, the message server arranges the identification codes into groups. The message server "stores and forwards" messages, and provides real-time message exchange; and keeps track of which message originates from which terminal, which message has been retrieved by which terminal and, on a group by group basis, which terminals are simultaneously connected to the message server.

8 Claims, 2 Drawing Sheets

MESSAGING SYSTEM

BACKGROUND OF THE INVENTION

1. Field of the Invention

The invention relates to a messaging system comprising mobile terminals operated by users and a network for connecting the terminals to a message server comprising means for exchanging messages originating from the terminals, making use of an identification code.

2. Description of the Prior Art

Such a system is generally known as a "voice mail" system. A voice mail system is, however, limited to the leaving of a message from A intended for B and the retrieval of that stored message by B.

People with occupations such as sales reps, maintenance engineers and the like do not see their colleagues very much and are often on the move. Such people nevertheless still need to communicate with their colleagues. Moreover, they often travel by car and are therefore limited in what they can do on the move.

SUMMARY OF THE INVENTION

It is an object of the messaging system according to the invention to meet the above-mentioned need by facilitating a "mobile newsclub". The proposed system can record messages and people can retrieve messages left by others. It can keep track of which message comes from which colleague and which messages have been retrieved by which colleague. It can also keep track of who simultaneously makes use of the mobile newsclub.

According to the invention, the message server accordingly comprises access means for granting each terminal access to the messages originating from terminals which use identification codes belonging to the same group of identification codes. By grouping the identification codes, groups of users or terminals are formed which can communicate groupwise to one another, either on the basis of "store and forward" or simultaneously ("real time"). The identification codes can be formed from terminal codes which depend on the terminals, or from user codes which depend on (and are entered by) the terminal users.

There are several options for grouping the identification codes: the identification codes within a group can be identical or non-identical, in which latter case the message server comprises grouping means for arranging the identification codes into groups.

The message server can comprise means for the leaving and retrieval ("store and forward") of messages by terminals with identification codes of the same group of identification codes. The message server can also comprise means for ("real time") sending of messages from one of the terminals to terminals with identification codes of the same group of identification codes.

The message server can comprise means for keeping track of which message originates from which terminal. The message server can also comprise means for keeping track of which message has been retrieved by which terminal. Finally, the message server can comprise means for keeping track on a group by group basis of which terminals are simultaneously connected to the message server.

The invention will now be further elucidated with reference to a working example.

DETAILED DESCRIPTION OF THE INVENTION

Figure 1:
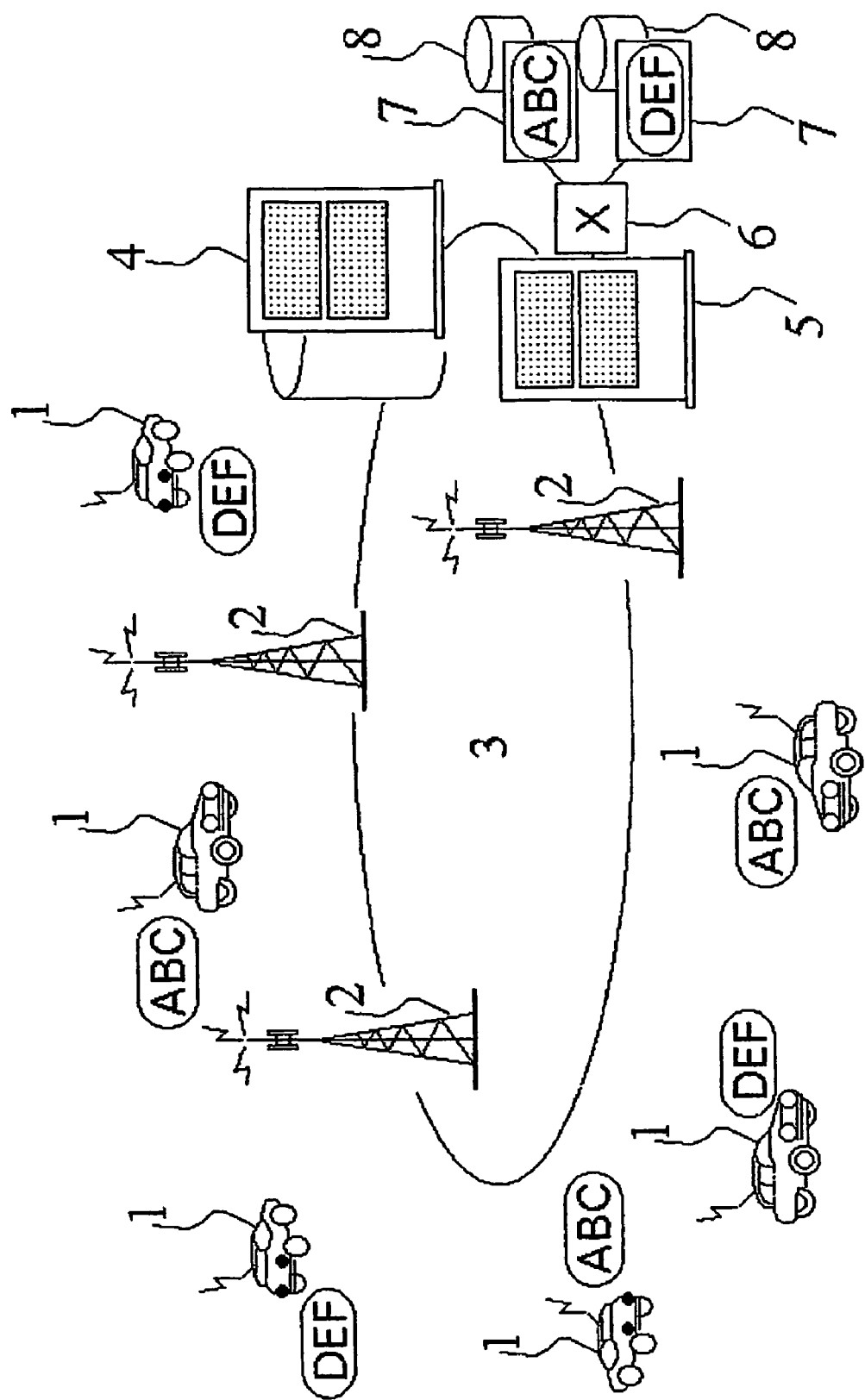
FIG. 1 depicts a block diagram of one embodiment of the inventive messaging system in which terminals utilize a associated group of identical identification codes.

The accompanying figures show a schematic illustration of the invention: mobile terminals 1 (the system according to the invention is not limited to use by groups of motorists, but this category of mobile users has a particular need for such a system) can, via base stations 2 and a network 3, link up to one another under the control of a communication server 4 (in practice usually a system of servers, databases, etc.). Moreover, the terminals 1 can link up to a message server 5 according to the invention.

The message server 5 comprises an access module 6 for granting each terminals 1 access to the messages originating from terminals 1 which use identification codes ("ABC", "DEF") belonging to the same group of identification codes. By grouping the identification codes, groups of users or terminals can be formed which can communicate groupwise to one another, either on the basis of "store and forward" or simultaneously ("real time")

The identification codes ("ABC","DEF") can be formed from terminal codes which are dependent on (determined by) the terminals, or from (personal) user codes which are dependent on (and entered by) the terminal users.

Figure 2:
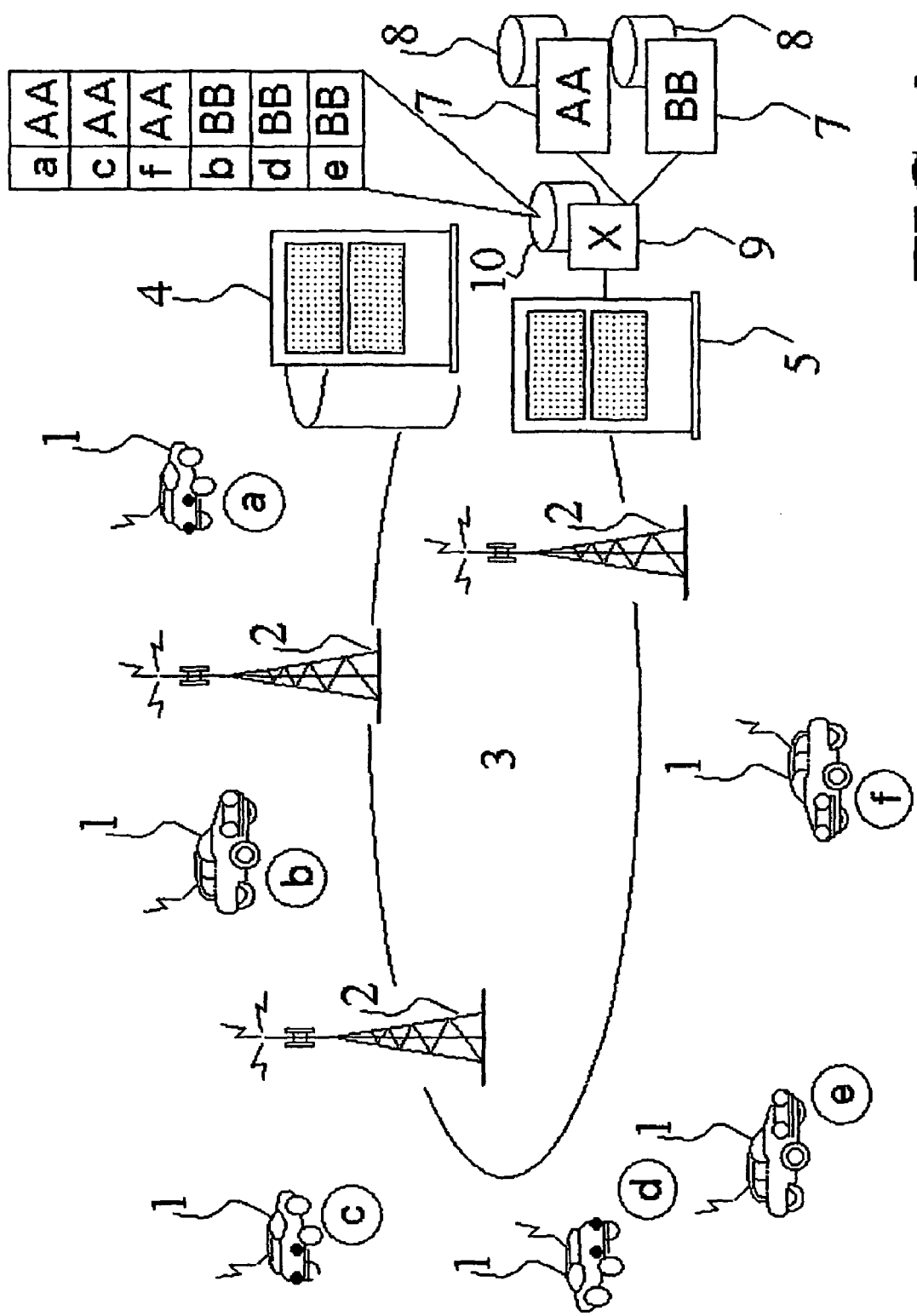
FIG. 2 depicts a block diagram of another embodiment of the inventive messaging system in which terminals utilize a associated group of different identification codes.

There are several options for grouping the identification codes: the identification codes within a group can be identical, as represented by FIG. 1, or non-identical, as represented by FIG. 2.

In FIG. 1 all messages from and to terminals 1 with the same identification codes ABC and DEF respectively are routed by access module 6 to an exchange module 7 via which messages from a terminal to terminals with identification codes of the same group, ABC and DEF respectively, can be exchanged either "real time" or by means of "store and forward" with the aid of memory modules 8, suitable for leaving and retrieving messages.

In FIG. 2 the message server 5 comprises a grouping module 9 for arranging the (in this case mutually non-identical) identification codes in groups and granting access (as with module 6 in FIG. 1) to the "group domains" assigned to the respective groups. The grouping module 9 comprises a reference register 10 with references of the identification codes, here a,b,c,d,e and f, to the terminal groups or user groups, here AA or BB respectively. Via the grouping module 9, incoming messages are transferred to the exchange modules 7 for the various groups AA, BB, etc.

The memory modules 8 can also be used (under the control of the exchange modules 7) for keeping track of which message originates from which terminal. In addition, the memory modules 8 can be used for keeping track of which message has been retrieved by which terminal. The exchange modules 7 can also be used for keeping track on a group by group (ABC,DEF,AA,BB) basis of which terminals are simultaneously connected to the message server 5.

The service to be implemented with the system described here can, for example, be used on the move, in a car, if there is a need for contact with colleagues. The car must have a mobile terminal enabling hands-free phone calls and, preferably, that can be voice operated. Although intended primarily for voice, the system also has the capability of (groupwise) data exchange. The system functions as a sort of shared voice (and/or data) mailbox for groups of users or terminals.

EXAMPLE OF A DIALOGUE

Sales rep (S): "Call mobile newsclub"
Messaging system (M): "KPN Mobile newsclub"
B: "New messages"
"Harry speaking: Does anyone know where I can find information about this or that?"
"Barry speaking: My wife gave birth to twins yesterday"
M: "No further messages"
M: "Leave a new message?"
S: "Yes"
"There are speed cameras on the A12"
"I've bought a new couch"
"I've just won a new customer"
"Stop"
B: "Pete is also logged in at the moment; do you wish to call him?"
R: "Yes"etc.

The invention claimed is:

1. Apparatus for a message server connected to a network having base stations and a plurality of mobile terminals, the message server comprising:
   means for storing a message, originating from any of the terminals in a pre-defined group of said plurality of mobile terminals and destined for every other terminal in the group, in a shared mailbox residing within the storing means and shared amongst all the terminals in the group, with each terminal in the group having a pre-defined identification code within a corresponding group of identification codes, the pre-defined identification code being associated with either the group of terminals itself or said each mobile terminal; and
   means for granting, through use of said group of identification codes, to each of said terminals in the group of mobile terminals access to the shared mailbox so as to either retrieve any message already stored therein from any other terminal in the group of mobile terminals or store a new message therein for dissemination to all other terminals in the group of mobile terminals.

2. The apparatus according to claim 1 wherein the identification codes are formed from terminal codes that are dependent on the terminals.

3. The apparatus according to claim 1 wherein the identification codes are formed from user codes that are dependent on users of the terminals.

4. The apparatus according to claim 1 wherein the identification codes are identical within said group of identification codes.

5. The apparatus according to claim 1 wherein the identification codes are non-identical within said group of identification codes and the message server further comprises grouping means for arranging the identification codes into the group of identification codes.

6. The apparatus according to claim 1 wherein the message server further comprises means for keeping track of which one of the messages originates from which one of the terminals in said plurality of mobile terminals.

7. The apparatus according to claim 1 wherein the message server further comprises means for keeping track of which one of the messages has been accessed by which one of the terminals in said plurality of mobile terminals.

8. The apparatus according to claim 1 wherein the message server further comprises means for keeping track on a group by group basis of which ones of the terminals in said plurality of mobile terminals are simultaneously connected to the message server.

* * * * *